United States Patent [19]

Bordini et al.

[11] 4,288,477
[45] Sep. 8, 1981

[54] READILY THERMOWELDABLE FILMS OF POLYOLEFINS COATED WITH LACQUERS BASED ON KETONIC RESINS

[75] Inventors: Fosco Bordini; Luigi Mauri, both of Terni, Italy

[73] Assignee: Moplefan S.p.A., Milan, Italy

[21] Appl. No.: 953,873

[22] Filed: Oct. 23, 1978

[30] Foreign Application Priority Data

Oct. 24, 1977 [IT] Italy ................................. 28894 A77

[51] Int. Cl.³ ...................... B32B 27/08; B32B 27/38
[52] U.S. Cl. .................................... 428/35; 427/412.3; 428/501; 428/516; 428/518; 428/520; 428/524; 428/910
[58] Field of Search ............... 428/501, 516, 518, 520, 428/910, 524, 35; 427/407

[56] References Cited

U.S. PATENT DOCUMENTS 3,224,896 12/1965 Quinn et al. ...................... 428/516
3,753,769 8/1973 Steiner ........................... 428/516 X

FOREIGN PATENT DOCUMENTS 55-16797 7/1970 Japan ................................. 428/501

Primary Examiner—Marion McCamish

[57] ABSTRACT

Films consisting essentially of alpha-olefin polymers, such as normally solid polypropylene consisting essentially of recurring propylene units and having a substantial crystalline polypropylene content, and in particular isotactic polypropylene, are coated with a ketonic resin resulting from the polycondensation of aldehydes with ketones, which coating renders the films readily thermoweldable and/or impervious to gases, vapors and the like. The coated films are useful for the manufacture of containers, covers, small bags, vessels and in general for the manufacture of articles useful in the packaging industry.

7 Claims, No Drawings

READILY THERMOWELDABLE FILMS OF POLYOLEFINS COATED WITH LACQUERS BASED ON KETONIC RESINS

THE PRIOR ART

Patents assigned to Montedison S.p.A. describe methods for preparing films from alpha-olefin polymers made up of macromolecules having, at least prevailingly, the stereo-regular structure, isotactic, and prepared by polymerizing propylene with the aid of stereospecific catalysts.

Because of their mechanical, protective and optical properties, films made from crystalline polyolefins, in particular from polypropylene as defined herein, the widest field of application therefor is in the packaging industry.

However, one difficulty encountered in transforming said films into finished packages arises from the fact that the transformation of the polyolefin films to finished packages is not readily accomplished because, for the most part, the existing automatic or semi-automatic machines for converting films to finished packages are not suitable for processing or transforming thermoplastic films such as those obtained from polyolefins, in particular from polypropylene. This is due to the fact that the automatic or semi-automatic machines have been designed and built taking into consideration only the characteristics of the most heretofore widely used packaging material, that is the cellophane films.

The fundamental difference between the polyolefin films, in particular films of polypropylene, and the cellophane films, consists in that the polyolefin films are thermoplastic materials while cellophane is a material that is insensible to heat until its inflammability limit is reached. As a consequence, this involves a different behavior of the two types of materials with respect to the automatic thermowelding devices coupled to the standard packaging machines.

In fact, while cellophane, which, usually, is coated with a thermoplastic lacquer that makes it thermoweldable, welds without any difficulty for that reason, the polyolefinic films, and expecially the polypropylene films, melt at the point of contact with the welding elements and tend to stick to those elements and to tear, thereby making it practically impossible to maintain a commercially reasonable operating speed for the machine.

It is known that the thermoweldability, impermeability and other properties of films of synthetic polymers can be improved by coating the films with materials capable of imparting said characteristics to the films.

One such method is to extrude a molten lacquer on the supporting film (extrusion coating). Another method is the so-called "lamination" of two films, one against the other, with or without employing adhesives. A further method consists in spreading a solution of the coating agent in a suitable solvent on the supporting film, and to couple the coating agent with an anchoring agent (primer) which facilitates the adhesion of the coating to the film. Often the primer is substituted by, or used in combination with, a pre-treatment of the supporting film with chemical agents, electrical non-piercing discharges, a flame, or other suitable pre-treating means.

Processes are also known which consist in coating the polyolefinic film with:

(a) a first layer of an imino compound, in particular polyethyleneimine, which has the function of favoring anchoring of the lacquer to the support; and with (b) a second layer consisting of one or more polymers favoring the weldability of the film and its impermeability to gases and vapors and the like, said polymers being chosen from among vinyl and vinylidene polymers and copolymers, acrylic and cellulosic polymers and copolymers, epoxy and other polymers and copolymers.

Japanese Pat. No. 16,797/69 discloses a polyolefin support having, as coatings thereon, (a) an undercoating of a ketone-aldehyde resin, such as a resin derived from (i) methyl ethyl ketone, diethyl ketone, methyl isobutyl ketone or cyclohexanone and (ii) formaldehyde, acetaldehyde or benzaldehyde; and (b) a top coating of an aqueous dispersion of a polymer such as polyvinyl chloride, vinyl chloride-vinylidene chloride copolymer, vinylidene chloride-acrylonitrile copolymer, or the like.

THE PRESENT INVENTION

One object of this invention is to provide a new type of coating for polyolefinic films which comprises, as essential constituents, ketonic resins obtained by polycondensation of aldehydes with ketones.

Another object is to provide polyolefinic films, in particular films of alpha-olefin polymers and more particularly of polypropylene consisting prevailingly of isotactic macromolecules, having the new coating and which are readily thermoweldable and/or impervious to gases, vapors and the like, and which can be transformed into articles for use in packaging a variety of materials using the machines available for transforming cellophane films into packaging articles of different sizes and shapes.

These and other objects are accomplished by the present invention in accordance with which the polyolefinic films are coated with ketonic resins which are, in general, obtained by polycondensation of aldehydes and cyclic ketones and, in particular, by polycondensation of formaldehyde and cyclohexanone, cyclopentanone, cycloheptanone and the like cyclic ketones.

The resinous aldehyde/ketone polycondensates have the advantages that they can be applied directly to the polyolefinic films without requiring a preliminary treatment of the films with anchoring agents (primers), and are not only suitable for use alone but also in mixtures with other vinyl polymers and copolymers, acrylic polymers and copolymers, and cellulose polymers and copolymers.

The capacity of the ketonic resins to adhere to the polyolefin films, even without a preliminary treatment with an anchoring agent, allows the localized application of the coating. This is extremely advantageous whenever the weldability is required only for a limited portion of the manufactured product, such as in the case where, having to weld only the ends of a bag or cover, it is sufficient to coat with the thermowelding lacquer only the portion of bag or cover that is directly involved in the welding and not the whole article, which represents a considerable economic advantage.

Using the ketonic resins according to this invention, in admixture with vinyl, acryl, and cellulose polymers and copolymers, in particular with nitrocellulose, it is possible to further improve the characteristics of the coated films, such as for instance the resistance of the weld, blocking, the attrition coefficient, and at the same time to maintain the good mechanical, optical and aesthetical characteristics peculiar to polyolefinic films.

The coating may be applied either on biaxially-stretched or non-stretched film, treated electrically or untreated. It may be aplied, also, on unstretched films or on films stretched in only one direction, in which case the stretching or stretchings is/are carried out after the coating.

The electrical treatment of the film, if used, is preferably carried out on SCAE-type device, although other similar or equivalent devices have also provided to be suitable.

The coating may be indifferently applied on one or both sides of the polypropylene film, whether biaxially stretched or unstretched. The coating according to this invention may be applied according to conventional methods, from polymer solutions or dispersions in either water or organic solvents, using conventional techniques, in particular spreading, dipping or the like.

The total thickness of the coating may vary from 1 to 20 microns.

If the ketonic resins are applied on films already coated with anchoring agents (primers), these latter will preferably consist of alkyleneimine polymers such as polyethyleneimine, polypropyleneimine and the like, or consist of amino compounds of low molecular weight such as: ethylendiamine, diethylentriamine, tetraethylenpentamine and the like.

There may also be used mixes containing from 20 to 80% by weight of ketonic resins and one or more polymers chosen from among acryl, vinyl and cellulose polymers and copolymers.

The vinyl polymers and copolymers are preferably polymers and copolymers of vinyl chloride, in particular copolymers of vinyl chloride/vinyl acetate.

Particularly useful acrylic and methacrylic polymers and copolymers for the purpose include polymethylacrylate, polyethylmethacrylate, polymethylacrylate, polyethylacrylate, the methylacrylate/ethylacrylate copolymers, methylmethacrylate/ethylmethacrylate copolymers, methylmethacrylate/n-butylmethacrylate copolymers and other like copolymers.

A cellulosic polymer which is particularly suitable for use in practicing this invention is nitrocellulose which is a nitration product of cellulose having a nitrogen content of between 11.5% and 12.5%, corresponding to the 34E rules (WASAE) (see Ullmans Encyklopaedie der Technischen Chemie—vol. 12, 797, (1960).

In the mixtures with ketonic resins there is preferably used 20-50% by weight of vinyl polymers and copolymers, 20-80% by weight of acrylic polymers and copolymers and 10-40% by weight of nitrocellulose.

The adhesion of the coating to the supporting polyolefinic film is measured by pressing a piece of self-adhesive cellulose tape against the surface of the coated film and then abruptly tearing off the cellulose tape. The coatings having an excellent adhesion will remain firmly attached to the supporting film when the tape is torn off, whereas the coating with a poor or bad adhesion will, on the contrary, be partially or even totally removed from the supporting film when the tape is ripped off.

With the "peeling test" method there is measured also the tensile stress resistance of the weld evaluated by means of a dynamometer.

The "peeling test" values exceeding 80-100 g/cm are good. However, the weld resistance values must be referred to the type of application for which the coated film is intended. Thus, 80-100 g/cm is an excellent value when the application is, for instance, the weld of coated film intended for wrapping cigarettes, while much higher welding resistance values are required when the coated film is to be used for the manufacture of container bags for rice, sugar and the like.

The resistance to crumpling of the film is assessed by energically crumpling with the hands for 10-20 seconds, one or more zones of the coated surface of the film and by then observing whether there occurs a detachment of the coating and formation of cracks.

The supports to which the thermoweldable coatings are applied in accordance with this invention consist, preferably, of films obtained from propylene polymers prepared with stereospecific catalysts. Before forming it into a film, the polymer may be additioned with: stabilizers, lubricants, plasticizers, colored pigments, agents with an anti-static action, fillers and other such like additives.

The following examples are given to illustrate the invention in more detail and are not limiting since, in practice, extensive variations and changes can be made without departing from the spirit and scope of the invention.

EXAMPLE 1

A polypropylene film obtained by extrusion of a propylene polymer consisting prevailingly of macromolecules having substantially the isotactic structure, stretched and with a thickness of 30 microns, was subjected to an electronic treatment on a SCAE-type device and then coated on one of its sides, using a standard buttering machine for thin sheets, with an aqueous 1% solution of polyethylenimine. Thereafter, the film was dried in an oven and coated with a second layer consisting of 100% by weight of a product obtained by condensing cyclohexanone and formic aldehyde and having a cryoscopic molecular weight of 1200.

The polymer of the second layer was applied as a solution in methylethylketone with a 25% content in solid product.

The solution was prepared at a temperature of 70° C. After spreading, the film was dried at 90° C. The coated film showed the following characteristics:

| | |
|---|---|
| thickness of the coating | 1.6 micron |
| adhesion (scotch-tape test) | excellent |
| resistance to crumpling | very poor because of the chalking of the lacquer |
| blocking at 43° C. (ASTM D 1146-53) | poor |
| transparency | excellent |
| slippiness (static attrition coefficient T.M.I.) | fair |
| resistance of the weld (peeling test) | 180 g/cm |
| welding temperature | 130° C. |

EXAMPLE 2

Example 1 was repeated except that the first primer layer consisting of polyethyleneimine was not applied to the polypropylene film.

The final coated film showed the same characteristics as the coated film of Example 1.

EXAMPLE 3

A polypropylene film obtained by extrusion of a propylene polymer consisting prevailingly of macromolecules having isotactic structure, stretched and with a thickness of 30 microns, was subjected to an electronic treatment on a SCAE-type device, and was then coated on one of its sides with an aqueous 1% polyethyleneimine solution spread on by means of a standard buttering machine for thin sheets. Thereupon, the film was dried in an oven and subsequently coated with a second layer consisting of a mixture of:

1. 50% by weight of a condensation product of cyclohexanone and formic aldehyde having a cryoscopic molecular weight of 1200;
2. 50% by weight of a vinyl chloride/vinyl acetate copolymer (87/13), having a Fikentscher constant K=50.

The polymers of the second layer were applied as a solution in methylketone with 25% in dry substance. The solution was prepared at a temperature of 70° C. After the coating, the film was dried at 90° C. and, thus coated, showed the following characteristics:

| thickness of the coating | 1.7 micron |
| --- | --- |
| adhesion (scotch-tape test) | excellent |
| resistance to crumpling | excellent |
| blocking at 43° C. (ASTM D 1146-53) | good |
| transparency | excellent |
| slippiness (static attrition coefficient T.M.I.) | good |
| resistance of the weld (peeling test) | 250 g/cm |
| welding temperature | 130° C. |

EXAMPLE 4

Example 3 was repeated, except that the first layer of primer consisting of polyethyleneimine was not applied.

The coated film thus obtained showed the same characteristics as the coated film of Example 3.

EXAMPLE 5

A polypropylene film obtained by extrusion of a propylene polymer consisting prevailingly of macromolecules having isotactic structure, stretched and of 30 microns thickness, was subjected to an electronic treatment with a SCAE-type device, then coated on one side, using a standard buttering machine for thin sheets, with an aqueous 1% solution of polyethyleneimine. Thereafter, the film was dried in an oven and then coated with a second layer consisting of a mixture of:

1. 50% by weight of a condensation product between cyclohexanone and formic aldehyde having a cryoscopic molecular weight of 1200;
2. 50% by weight of butylmethacrylate/methylmethacrylate copolymer (75/25) having $[\eta]=0.25$ (in $CHCl_3$ at 20° C.).

The polymers of the second layer were applied as a solution in methylethylketone with a 25% content in dry substance.

The solution was prepared at a temperature of 70° C. After coating, the film was then dried at 90° C. and the thus coated film showed the following characteristics:

| thickness of the coating | 1.5 micron |
| --- | --- |
| adhesion (scotch-tape test) | excellent |
| resistance to crumpling | excellent |
| blocking at 43° C. (ASTM D 1146-53) | poor |
| transparency | excellent |
| slippiness (static attrition coefficient, T.M.I.) | good |
| resistance of the weld (peeling test) | 230 g/cm |

| -continued | |
| --- | --- |
| welding temperature | 130° C. |

EXAMPLE 6

Example 5 was repeated, except that the first layer of the primer, polyethyleneimine, was not applied.

The coated film thus obtained showed the same characteristics as the coated film of Example 5.

EXAMPLE 7

A polypropylene film, obtained by extrusion of a propylene polymer consisting prevailingly of macromolecules having isotactic structure, stretched and with a thickness of 30 micron, was subjected to an electronic treatment with a SCAE-type device and was then coated on one side, using a standard buttering machine for thin sheets, with a 1% aqueous solution of polyethyleneimine. The thus coated film was then dried in an oven and subsequently coated with a second layer consisting of a mixture of:

1. 20% by weight of a condensation product of cyclohexanone and formic aldehyde having a cryoscopic molecular weight of 1200;
2. 80% by weight of a butylmethacrylate/methymethacrylate copolymer (75/25) having an $[\eta]=0.25$ (in $CHCl_3$ at 20° C.).

The polymers of the second layer were in the form of solutions in methylethylketone with 25% of dry content. The solution was prepared at a temperature of 70° C.

After coating, the film was dried at 90° C. and the thus coated film showed the following characteristics:

| thickness of the coating | 1.4 micron |
| --- | --- |
| adhesion (scotch-tape test) | excellent |
| resistance to crumpling | excellent |
| blocking at 43° C. (ASTM D 1146-53) | poor |
| transparency | excellent |
| slippiness (static attrition coefficient T.M.I.) | good |
| resistance of the weld (peeling test) | 250 g/cm |
| welding temperature | 130° C. |

EXAMPLE 8

Example 7 was repeated, except that a first layer of primer consisting of polyethyleneimine was not applied.

The coated film obtained showed the same characteristics as the coated film of Example 7.

EXAMPLE 9

A polypropylene film obtained by extrusion of a propylene polymer consisting prevailingly of isotactic macromolecules, stretched and with a thickness of 30 micron, was subjected to an electronic treatment on a SCAE-type device and was then coated on one of its sides with an aqueous 1% solution of polyethyleneimine, by means of a standard buttering machine for thin sheets. The thus coated film was thereupon dried in an oven and then coated with a second layer consisting of a mixture of:

1. 20% by weight of a product obtained by condensing cyclohexanone and formic aldehyde and having a cryoscopic molecular weight of 1200;

2. 60% by weight of butylmethacrylate/methymethacrylate copolymer (75/25) having [η]=0.25 (in CHCl₃ at 20° C.);
3. 20% by weight of a 34E standard nitrocellulose (12% nitrogen and [η] in acetone=0.4).

The polymers of the second layer were applied as a methylethylketone solution with 25% dry content. The solution was prepared at a temperature of 70° C. After coating of the film, it was dried at 90° C. and, thus coated and dried showed the following characteristics:

| thickness of the coating | 1.5 micron |
|---|---|
| adhesion (scotch-tape test) | excellent |
| resistance to crumpling | excellent |
| blocking at 43° C. (ASTM D 1146-53) | good |
| transparency | excellent |
| slippiness (static attrition coefficient, T.M.I.) | good |
| resistance of the weld (peeling test) | 230 g/cm |
| welding temperature | 130° C. |

EXAMPLE 10

Example 9 was repeated, except that the first layer of primer consisting of polyethyleneimine was not applied.

The coated film thus obtained showed the same characteristics as the coated film obtained in Example 8.

EXAMPLE 11 (Comparative)

A polypropylene film obtained by extrusion of a propylene polymer consisting prevailingly of macromolecules having the isotactic structure, stretched and with a thickness of 30 micron, was subjected to an electronic treatment on a SCAE-type device, after which it was coated on one side with an aqueous 1% solution of polyethyleneimine by means of a standard buttering machine for thin sheets. After this coating, the film was dried in an oven and then coated with a second layer consisting of 100% by weight of a vinyl chloride/vinyl acetate copolymer (87/13) having a Fikentscher constant K=50. The copolymer of the second layer was applied as a solution in methylethylketone with 25% of dry content. The solution was prepared at 70° C. After the coating, the film was dried at 90° C. and then showed the following characteristics:

| thickness of the coating | 1.5 micron |
|---|---|
| adhesion (scotch-tape test) | good |
| resistance to crumpling | excellent |
| blocking at 43° C. (ASTM D 1146-53) | good |
| transparency | excellent |
| slippiness (static attrition coefficient, T.M.I.) | good |
| resistance of the weld (peeling test) | 50 g/cm |
| welding temperature | 130° C. |

EXAMPLE 12

Example 11 was repeated, except that the first layer of primer consisting of polyethyleneimine was not utilized.

Subjected to the scotch-tape test, the applied coating peels off, showing that there is no adhesion to the polypropylene film.

EXAMPLE 13 (Comparative)

A polypropylene film obtained by extrusion of a propylene polymer consisting prevailingly of macromolecules having the isotactic structure, stretched and with a thickness of 30 micron, was subjected to an electronic treatment on a SCAE-type device and was then coated on one side with an aqueous 1% solution of polyethyleneimine, using a standard buttering machine for thin sheets. Thereafter, the film thus coated was dried in an oven and coated with a second layer consisting 100% of a 34E standard nitrocellulose (about 12% of nitrogen and [η] in acetone=0.4).

The polymer of the second layer was applied as a solution in methylethylketone with 25% of dry content.

The solution was prepared at a temperature of 70° C.

After coating of the film, it was dried at 90° C. and showed the following characteristics:

| thickness of the coating | 1.5 micron |
|---|---|
| adhesion (scotch-tape test) | excellent |
| resistance to crumpling | excellent |
| blocking at 43° C. (ASTM D 1146-53) | excellent |
| transparency | excellent |
| slippiness (static attrition coefficient T.M.I.) | excellent |
| resistance of the weld (peeling test) | does not weld |
| welding temperature | 130° |

EXAMPLE 14

Example 13 was repeated, except that the first layer of primer consisting of polyethyleneimine was not applied. No adhesion was obtained inasmuch as the coating peels off under the scotch-tape test.

The supporting film which is coated in accordance with this invention is formed from a crystalline polymer of an alphaolefin CH₂=CHR in which R is an alkyl radical containing from 1 to 6 carbon atoms. In one preferred embodiment, the film is formed from normally solid polypropylene consisting essentially of recurring propylene units, having a substantial crystalline polypropylene content. In a still more preferred embodiment of the invention, the film which is coated is formed of isotactic polypropylene. As defined in Natta et al U.S. Pat. No. 3,112,300, isotactic polypropylene is a high molecular weight polypropylene consisting essentially of polypropylene made up of isotactic macromolecules which are insoluble in boiling n-heptane and have substantially the isotactic stereoregular structure.

What we claim is:

1. Bags and packaging articles formed of a heat-sealed film of normally solid polypropylene consisting essentially of recurring propylene units, having a substantial crystalline polypropylene content, said film being coated on at least one of its surfaces with a ketonic resin or with a mixture of a ketonic resin and at least one polymer selected from the group consisting of vinyl, acrylic and cellulose polymers.

2. A process for making bags and packaging articles which comprises applying directly to at least one surface of a polyolefin film or to at least one surface of a polyolefin film pretreated with a primar, a coating consisting of (A) a ketonic resin, or (B) a mixture of a ketonic resin with at least one polymer selected from the group consisting of vinyl, acrylic and cellulose polymers, and thereafter heat-sealing the coated film.

3. The process of claim 2, in which the polyolefin film coated is stretched in one or both directions.

4. The process of claim 2, in which the polyolefin film which is coated is a film of polypropylene consisting prevailingly of macromolecules having isotactic structure.

5. The process of claim 2, in which the polyolefin film which is coated is a film consisting of isotactic polypropylene made up of isotactic macromolecules having substantially the isotactic structure and being insoluble in boiling n-heptane.

6. The process of claim 2, in which the ketonic resin is a polycondensate of aldehydes with cyclic kentones.

7. The process of claim 2, in which the coating is a mixture (B) containing from 20% to 80% by weight of the ketonic resin.

* * * * *